(12) United States Patent
Cao et al.

(10) Patent No.: US 11,270,072 B2
(45) Date of Patent: Mar. 8, 2022

(54) SYSTEM AND METHOD FOR CROSS-DOMAIN TRANSFERABLE NEURAL COHERENCE MODEL

(71) Applicant: ROYAL BANK OF CANADA, Toronto (CA)

(72) Inventors: Yanshuai Cao, Toronto (CA); Peng Z. Xu, Toronto (CA); Hamidreza Saghir, Toronto (CA); Jin Sung Kang, Toronto (CA); Teng Long, Toronto (CA); Jackie C. K. Cheung, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 103 days.

(21) Appl. No.: 16/669,741

(22) Filed: Oct. 31, 2019

(65) Prior Publication Data

US 2020/0134016 A1 Apr. 30, 2020

Related U.S. Application Data

(60) Provisional application No. 62/753,621, filed on Oct. 31, 2018.

(51) Int. Cl.
*G06F 40/284* (2020.01)
*G06N 3/08* (2006.01)
*G06N 3/04* (2006.01)
*G06F 40/30* (2020.01)

(52) U.S. Cl.
CPC ............ *G06F 40/284* (2020.01); *G06F 40/30* (2020.01); *G06N 3/0454* (2013.01); *G06N 3/08* (2013.01)

(58) Field of Classification Search
CPC ..... G06F 17/277; G06F 17/2785; G06N 3/08; G06N 3/0454
See application file for complete search history.

(56) References Cited

U.S. PATENT DOCUMENTS 10,147,052 B1 * 12/2018 Lendvay ................ G06N 5/022
10,388,274 B1 * 8/2019 Hoffmeister ...... G06F 16/24522
11,048,879 B2 * 6/2021 Buhrmann ............ G06F 40/295
(Continued)

OTHER PUBLICATIONS

Regina Barzilay and Mirella Lapata. 2008. Modeling local coherence: An entity-based approach. Computational Linguistics, 34(1):1-34.
(Continued)

*Primary Examiner* — Kevin Ky
(74) *Attorney, Agent, or Firm* — Norton Rose Fulbright Canada LLP

(57) ABSTRACT

Systems and methods of automatically generating a coherence score for text data is provided. The approach includes receiving a plurality of string tokens representing decomposed portions of the target text data object. A trained neural network is provided that has been trained against a plurality of corpuses of training text across a plurality of topics. The string tokens are arranged to extract string tokens representing adjacent sentence pairs of the target text data object. For each adjacent sentence pair, the neural network generates a local coherence score representing a coherence level of the adjacent sentence pair of the target text data object, which are then aggregated for each adjacent sentence pair of the target text data object to generate a global coherence score for the target text data object.

22 Claims, 17 Drawing Sheets

(56) References Cited

U.S. PATENT DOCUMENTS

| | | | |
|---|---|---|---|
| 2018/0218126 A1* | 8/2018 | Salazar | G16H 70/20 |
| 2018/0225274 A1* | 8/2018 | Tommy | G06F 40/232 |
| 2018/0365229 A1* | 12/2018 | Buhrmann | G06F 40/216 |
| 2018/0365323 A1* | 12/2018 | Doornenbal | G06F 16/335 |
| 2021/0142002 A1* | 5/2021 | Cui | G06F 40/30 |

OTHER PUBLICATIONS

Jill Burstein, Joel Tetreault, and Slava Andreyev. 2010. Using entity-based features to model coherence in student essays. In Human language technologies: The 2010 annual conference of the North American chapter of the Association for Computational Linguistics, pp. 681-684. Association for Computational Linguistics.

Alexis Conneau, Douwe Kiela, Holger Schwenk, Loic Barrault, and Antoine Bordes. 2017. Supervised learning of universal sentence representations from natural language inference data EMNLP.

Micha Elsner and Eugene Charniak. 2011. Extending the entity grid with entity-specific features. In Proceedings of the 19th Annual Meeting of the Association for Computational Linguistics: Human Language Technologies: short papers-vol. 2, pp. 125-129. Association for Computational Linguistics.

Micha Elsner, Joseph Austerweil, and Eugene Charniak. 2007. A unified local and global model for discourse coherence. In Human Language Technologies 2007: The Conference of the North American Chapter of the Association for Computational Linguistics; Proceedings of the Main Conference, pp. 436-443.

Vanessa Wei Feng and Graeme Hirst. 2012. Extending the entity-based coherence model with multiple ranks. In Proceedings of the 13th Conference of the European Chapter of the Association for Computational Linguistics, pp. 315-324. Association for Computational Linguistics.

Barbara J Grosz, ScottWeinstein, and Aravind K Joshi. 1995. Centering: A framework for modeling the local coherence of discourse. Computational linguistics, 21 (2):203-225.

Camille Guinaudeau and Michael Strube. 2013. Graph-based local coherence modeling. In Proceedings of the 51st Annual Meeting of the Association for Computational Linguistics (vol. 1: Long Papers), vol. 1, pp. 93-103.

Ari Holtzman, Jan Buys, Maxwell Forbes, Antoine Bosselut, David Golub, and Yejin Choi. 2018. Learning to write with cooperative discriminators. arXiv preprint arXiv: 1805.06087.

Chloe Kiddon, Luke Zettlemoyer, and Yejin Choi. 2016. Globally coherent text generation with neural checklist models. n Proceedings of the 2016 Conference on Empirical Methods in Natural Language Processing, pp. 329-339.

Diederik P Kingma and Jimmy Ba. 2014. Adam: A method for stochastic optimization. arXiv preprint arXiv:1412.6980.

Ryan Kiros, Yukun Zhu, Ruslan R Salakhutdinov, Richard Zemel, Raquel Urtasun, Antonio Torralba, and Sanja Fidler. 2015 Skip-thought vectors In Advances in neural information processing systems, pp. 3294-3302.

Jiwei Li and Eduard Hovy. 2014. A model of coherence based on distributed sentence representation. In Proceedings of the 2014 Conference on Empirical Methods in Natural Language Processing (EMNLP), pp. 2039-2048.

Jiwei Li and Dan Jurafsky. 2017. Neural net models for open-domain discourse coherence. In Proceedings of the 2017 Conference on Empirical Methods in Natural Language Processing (EMNLP), pp. 198-209.

Lajanugen Logeswaran, Honglak Lee, and Dragomir Radev. 2018. Sentence ordering and coherence modeling using Yecurrent neural networks. AAAI.

Annie Louis and Ani Nenkova. 2012. A coherence model based on syntactic patterns. In Proceedings of the 2012 Joint Conference on Empirical Methods in Natural Language Processing and Computational Natural Language Learning, pp. 1157-1168. Association for Computational Linguistics.

Eleni Miltsakaki and Karen Kukich. 2004. Evaluation of text coherence for electronic essay scoring systems. Natural Language Engineering, 10(1):25-55.

Tasnim Mohiuddin, Shafiq Joty, and Dat Tien Nguyen. 2018. Coherence modeling of asynchronous conversations: A neural entity grid approach. arXiv preprint arXiv: 1805.02275.

Dat Tien Nguyen and Shafiq Joty. 2017. A neural local coherence model. In Proceedings of the 55th Annual Meeting oi the Association for Computational Linguistics (vol. 1: Long Papers), vol. 1, pp. 1320-1330.

Cesc C Park and Gunhee Kim. 2015. Expressing an image stream with a sequence of natural sentences. In Advances n Neural Information Processing Systems, pp. 73-81.

Jeffrey Pennington, Richard Socher, and Christopher Manning. 2014. Glove: Global vectors for word representation. In Proceedings of the 2014 conference on empirical methods in natural language processing (EMNLP), pp. 1532-1543.

Matthew E Peters, Mark Neumann, Mohit Iyyer, Matt Gardner, Christopher Clark, Kenton Lee, and Luke Zettlemoyer. 2018 Deep contextualized word representations NAACL.

Sandra A Thompson and William C Mann. 1987. Rhetorical structure theory. IPRA Papers in Pragmatics, 1 (1):79-105.

Frieu H Trinh, Andrew M Dai, Thang Luong, and Quoc V Le. 2018. Learning longer-term dependencies in mns with auxiliary losses. arXiv preprint arXiv:1803.00144.

Suzan Verberne, Lou Boves, Nelleke Oostdijk, and Peter-Amo Coppen. 2007. Evaluating discoursebased answer axil action for why-question answering. In Proceedings of the 30th annual international Acm Sigir conference on Research and development in information retrieval, pp. 735-736. ACM.

\* cited by examiner

Ordered: 0.6458637

1. Lois Utz was an American children's book author, illustrator, poet, and artist.
2. For most of her life, Utz resided in Little Falls, New Jersey.
3. She received her Associate degree in Fine Arts from the Art Students League of New York.
4. Utz wrote a poetry column for the "Paterson Morning Call" and published in literary anthologies nationally.
5. In 1962, she had a daughter, Heidi.
6. While exhibiting her paintings and collages, she began creating children's books.
7. For many years, she produced and sold collage works through her business, Lois Utz Originals.
8. Utz also collaborated as a lyricist with classical composer Richard Lane on a number of songs, including several for children.
9. Throughout her life, she worked as a volunteer for the mentally ill and wrote several novels about her experiences.
10. She later received a Bachelor of Arts degree in psychology and a Master of Arts degree in counseling, and practiced as a therapist until her death in 1986.

FIG. 6A

Shuffled: -0.35308224

1. Lois Utz was an American children's book author, illustrator, poet, and artist.
2. In 1962, she had a daughter, Heidi.
3. For most of her life, Utz resided in Little Falls, New Jersey.
4. She received her Associate degree in Fine Arts from the Art Students League of New York.
5. While exhibiting her paintings and collages, she began creating children's books.
6. Throughout her life, she worked as a volunteer for the mentally ill and wrote several novels about her experiences.
7. Utz also collaborated as a lyricist with classical composer Richard Lane on a number of songs, including several for children.
8. For many years, she produced and sold collage works through her business, Lois Utz Originals.
9. She later received a Bachelor of Arts degree in psychology and a Master of Arts degree in counseling, and practiced as a therapist until her death in 1986.
10. Utz wrote a poetry column for the "Paterson Morning Call" and published in literary anthologies nationally.

FIG. 6B

Ordered: 0.64581776

1. Additional Broadway credits include playing Frederick Barrett in " Titanic ", Lincoln Center's " Carousel ", and " Blood Brothers ".
2. Off - Broadway credits include Andrew Lippa 's " The Wild Party " in 2000 opposite Julia Murney and Idina Menzel for which he received a Drama Desk Award nomination , as well as Adam Guettel 's " Floyd Collins " and the Gershwins ' " Pardon My English " .
3. He appeared in Martin McDonagh 's " The Lieutenant of Inishmore " on Broadway , replaced Norbert Leo Butz in " Dirty Rotten Scoundrels " , and starred in " The Apple Tree " opposite Kristin Chenoweth .
4. In 2004 , he released a Christmas album titled " From Christmas Eve to Christmas Morn ".
5. He was the Broadway version of Bob Wallace , whose character was originated by Bing Crosby , in " White Christmas " in 2004 .
6. He played the role of Dan Goodman in the new musical " Next to Normal " Off - Broadway at Second Stage Theatre in 2008 .
7. He then starred opposite Daniel Breaker , Sutton Foster and Christopher Sieber as the titular character in " Shrek the Musical " .
8. The show began previews on Broadway November 8 , 2008 and opened on December 14 at The Broadway Theatre after a tryout in Seattle .
9. For this role he won the Outer Critics Circle Award for Outstanding Actor in a Musical and the Drama Desk Award for Outstanding Actor in a Musical .
10. He was also nominated for the Tony Award for Best Leading Actor in a Musical for his portrayal .
11. He departed the cast after one year in the role and was replaced by Ben Crawford .

FIG. 6C

Shuffled: -0.69724464

1. He was also nominated for the Tony Award for Best Leading Actor in a Musical for his portrayal.
2. He appeared in Martin McDonagh's "The Lieutenant of Inishmore" on Broadway, replaced Norbert Leo Butz in "Dirty Rotten Scoundrels", and starred in "The Apple Tree" opposite Kristin Chenoweth.
3. He was the Broadway version of Bob Wallace, whose character was originated by Bing Crosby, in "White Christmas" in 2004.
4. He played the role of Dan Goodman in the new musical "Next to Normal" Off-Broadway at Second Stage Theatre in 2008.
5. He departed the cast after one year in the role and was replaced by Ben Crawford.
6. Additional Broadway credits include playing Frederick Barrett in "Titanic", Lincoln Center's "Carousel", and "Blood Brothers".
7. For this role he won the Outer Critics Circle Award for Outstanding Actor in a Musical and the Drama Desk Award for Outstanding Actor in a Musical.
8. In 2004, he released a Christmas album titled "From Christmas Eve to Christmas Morn".
9. The show began previews on Broadway November 8, 2008 and opened on December 14 at The Broadway Theatre after a tryout in Seattle.
10. Off-Broadway credits include Andrew Lippa's "The Wild Party" in 2000 opposite Julia Murney and Idina Menzel for which he received a Drama Desk Award nomination, as well as Adam Guettel's "Floyd Collins" and the Gershwins' "Pardon My English".
11. He then starred opposite Daniel Breaker, Sutton Foster and Christopher Sieber as the titular character in "Shrek the Musical".

FIG. 6D

Original Article and order

1. "In 1990, Hathaway released her self-titled first album, which debuted at number 191 on the "" Billboard "" Hot 200 and number 18 on the Top R&B / Hip - Hop Albums charts .
2. The album 's lead single "" Heaven Knows "" became a top ten single peaking at number 3 on the Hot R&B charts .
3. The album 's second single "" Baby Do n't Cry "" only charted at number 18 on the Hot R&B charts .
4. The follow - up single "" I 'm Coming Back "" was less successful .
5. The album 's final single "" It 's Somethin' "" debuted at numb21 on the Hot R&B charts .
6. In 1991, Hathaway released an EP entitled "" Night & Day "" .
7. The EP was only released in Japan but the single "" Night & Day "" was released in America .
8. "" Night & Day "" ' debuted at number 110 on the Hot R&B charts .
9. In 1992, Hathaway appeared on Grover Washington 's album "" Next Exit "" .
10. The song "" Love Like This "" , which featured vocals by Hathaway, was chosen to be the lead single off the album .
11. The single charted at number 31 on the Hot R&B charts ."

FIG. 7A

Model produced ordering:
[1, 9, 11, 3, 10, 2, 6, 7, 4, 3, 8]

1. "In 1990, Hathaway released her self - titled first album, which debuted at number 191 on the ''' Billboard ''' Hot 200 and number 18 on the Top R&B / Hip - Hop Albums charts.
2. In 1992, Hathaway appeared on Grover Washington 's album '''' Next Exit '''' .
3. The single charted at number 31 on the Hot R&B charts."
4. The album 's second single ''' Baby Do n't Cry '''' only charted at number 18 on the Hot R&B charts .
5. The song '''' Love Like This '''' , which featured vocals by Hathaway , was chosen to be the lead single off the album .
6. The album 's lead single '''' Heaven Knows '''' became a top ten single peaking at number 3 on the Hot R&B charts .
7. In 1991, Hathaway released an EP entitled ''' Night & Day ''' .
8. The EP was only released in Japan but the single '''' Night & Day '''' was released in America .
9. The follow - up single '''' I 'm Coming Back '''' was less successful .
10. The album 's second single ''' Baby Do n't Cry ''' only charted at number 18 on the Hot R&B charts .
11. ''' Night & Day '''' debuted at number 110 on the Hot R&B charts .

1. "In 1990, Hathaway released her self-titled first album, which debuted at number 191 on the ''' Billboard ''' Hot 200 and number 18 on the Top R&B / Hip-Hop Albums charts.
2. In 1991, Hathaway released an EP entitled ''' Night & Day '''.
3. The EP was only released in Japan but the single ''' Night & Day ''' was released in America.
4. The single charted at number 31 on the Hot R&B charts."
5. The album's second single ''' Baby Do n't Cry ''' only charted at number 18 on the Hot R&B charts.
6. The song ''' Love Like This ''', which featured vocals by Hathaway, was chosen to be the lead single off the album.
7. The album's final single ''' It 's Somethin' ''' debuted at numb21 on the Hot R&B charts.
8. The follow-up single ''' I 'm Coming Back ''' was less successful.
9. ''' Night & Day '''' debuted at number 110 on the Hot R&B charts.
10. The album's lead single ''' Heaven Knows ''' became a top ten single peaking at number 3 on the Hot R&B charts.
11. In 1992, Hathaway appeared on Grover Washington 's album ''' Next Exit '''.

FIG. 7C

Length: 12.065388749552131, 2.9930390131588993, 11.0
Spearman: 5582, 0.34481304011102578, 0.29631987154070194
[3509 4485 606 3457 1754 2700 257 3675 3479 368]
Guess: [0, 8, 15, 7, 13, 14, 9, 12, 10, 11, 6, 5, 3, 4, 1, 2] - Hitler
Guess: [0, 10, 14, 13, 12, 11, 8, 7, 4, 9, 5, 3, 6, 1, 2] - War
Guess: [0, 9, 11, 12, 13, 10, 14, 15, 8, 7, 1, 2, 6, 3, 4, 5]
Guess: [0, 10, 9, 11, 7, 8, 6, 5, 4, 3, 1, 2]
Guess: [0, 12, 18, 13, 14, 15, 17, 11, 8, 10, 9, 4, 3, 16, 5, 1, 6, 2, 7]
Guess: [0, 8, 9, 10, 7, 6, 5, 2, 4, 3, 1]
Guess: [0, 11, 12, 8, 15, 14, 16, 10, 13, 7, 6, 2, 3, 4, 1, 9, 5]
Guess: [0, 9, 8, 10, 6, 7, 5, 1, 4, 3, 2]
Guess: [0, 9, 8, 7, 10, 4, 5, 6, 3, 2, 1]
Guess: [0, 10, 9, 11, 13, 8, 5, 12, 4, 7, 2, 3, 6, 1]
Kendall: 5582, 0.27448651147314448, 0.24905426307624395
[3675 4485 4367 4562 4145 2091 4067 2700 823 3457]
Guess: [0, 9, 8, 10, 6, 7, 5, 1, 4, 3, 2]
Guess: [0, 10, 14, 13, 12, 11, 8, 7, 4, 9, 5, 3, 6, 1, 2]
Guess: [0, 9, 8, 6, 7, 3, 5, 4, 1, 2]
Guess: [0, 10, 6, 9, 8, 5, 4, 7, 3, 2, 1]
Guess: [0, 4, 21, 19, 11, 20, 16, 9, 18, 2, 17, 15, 14, 13, 12, 10, 8, 7, 6, 5, 3, 1]
Guess: [0, 9, 8, 7, 6, 4, 2, 3, 5, 1]
Guess: [0, 6, 9, 8, 7, 5, 4, 2, 3, 1]
Guess: [0, 8, 9, 10, 7, 6, 5, 2, 4, 3, 1]
Guess: [0, 8, 5, 9, 7, 6, 4, 3, 2, 1]
Guess: [0, 10, 9, 11, 7, 8, 6, 5, 4, 3, 1, 2]

FIG. 7D

Sentence 606

1. "At age six Starkey developed appendicitis.
2. Following a routine appendectomy he contracted peritonitis, causing him to fall into a coma that lasted for days.
3. His recovery spanned twelve months, which he spent away from his family at Liverpool's Myrtle Street children's hospital.
4. Upon his discharge in May 1948, his mother allowed him to stay home, causing him to miss school.
5. At age eight, he remained illiterate, with a poor grasp of mathematics.
6. His lack of education contributed to a feeling of alienation at school, which resulted in his regularly playing truant at Sefton Park.
7. After several years of twice-weekly tutoring from his surrogate sister and neighbour, Marie Maguire Crawford, Starkey had nearly caught up to his peers academically, but in 1953, he contracted tuberculosis and was admitted to a sanatorium, where he remained for two years.
8. During his stay the medical staff made an effort to stimulate motor activity and relieve boredom by encouraging their patients to join the hospital band, leading to his first exposure to a percussion instrument: a makeshift mallet made from a cotton bobbin that he used to strike the cabinets next to his bed.
9. Soon afterwards, he grew increasingly interested in drumming, receiving a copy of the Alyn Ainsworth song ''' Bedtime for Drums ''' as a convalescence gift from Crawford.
10. Starkey commented: ''' I was in the hospital band.
11. That's where I really started playing.
12. I never wanted anything else from there on.
13. My grandparents gave me a mandolin and a banjo, but I did n't want them.
14. My grandfather gave me a harmonica
15. we had a piano — nothing.
16. Only the drums ''' ."

FIG. 7E

Guess: [1, 10, 12, 13, 14, 11, 15, 16, 9, 8, 2, 3, 7, 4, 5, 6]

1. "At age six Starkey developed appendicitis .
2. Starkey commented : "" I was in the hospital band
3. I never wanted anything else from there on
4. My grandparents gave me a mandolin and a banjo , but I did n't want them
5. My grandfather gave me a harmonica
6. That 's where I really started playing .
7. we had a piano -- nothing .
8. Only the drums "" .
9. Soon afterwards , he grew increasingly interested in drumming , receiving a copy of the Alyn Ainsworth song "" Bedtime for Drums "" as a convalescence gift from Crawford .
10. During his stay the medical staff made an effort to stimulate motor activity and relieve boredom by encouraging their patients to join the hospital band , leading to his first exposure to a percussion instrument : a makeshift mallet made from a cotton bobbin that he used to strike the cabinets next to his bed .
11. Following a routine appendectomy he contracted peritonitis , causing him to fall into a coma that lasted for days.
12. His recovery spanned twelve months , which he spent away from his family at Liverpool 's Myrtle Street children 's hospital .
13. After several years of twice - weekly tutoring from his surrogate sister and neighbour , Marie Maguire Crawford , Starkey had nearly caught up to his peers academically , but in 1953 , he contracted tuberculosis and was admitted to a sanatorium , where he remained for two years.
14. Upon his discharge in May 1948 , his mother allowed him to stay home , causing him to miss school .
15. At age eight , he remained illiterate , with a poor grasp of mathematics .
16. His lack of education contributed to a feeling of alienation at school , which resulted in his regularly playing truant at Sefton Park .

FIG. 7F

Sentence 3457
1. "But there was also speculation over how long Reagan had demonstrated symptoms of mental degeneration .
2. Not long after the attempted assassination of Ronald Reagan , at a reception for mayors , Reagan greeted his Secretary of Housing and Urban Development Samuel Pierce in 1981 by saying ''' How are you , Mr Mayor ?
3. How are things in your city ''' ?
4. , although he later realized his mistake .
5. Former CBS White House correspondent Lesley Stahl recounted that , in her final meeting with the president in 1986 , Reagan did not seem to know who Stahl was , and that she came close to reporting that Reagan was senile , but at the end of the meeting , Reagan had regained his alertness .
6. However , Dr. Lawrence K. Altman , a physician employed as a reporter for ''' The New York Times ''' , noted that ''' the line between mere forgetfulness and the beginning of Alzheimer's can be fuzzy , ''' and all four of Reagan's White House doctors said that they saw no evidence of Alzheimer's while he was president .
7. Dr. John E. Hutton , Reagan's primary physician from 1984 to 1989 , said the president ''' absolutely ''' did not ''' show any signs of dementia or Alzheimer's ''' .
8. His former Chief of Staff James Baker considered ''' ludicrous ''' the idea that Reagan slept during cabinet meetings .
9. Other staff members , former aides , and friends said they saw no indication of Alzheimer's while he was president .
10. Reagan did experience occasional memory lapses , though , especially with names .
11. Reagan's doctors say that he only began exhibiting overt symptoms of the illness in late 1992 or 1993 , several years after he had left office .
12. For example , Reagan repeated a toast to Margaret Thatcher , with identical words and gestures , at his 82nd - birthday party on February 6 , 1993 ."

FIG. 7G

Guess: [1, 11, 10, 12, 8, 9, 7, 6, 5, 4, 2, 3]

1. "But there was also speculation over how long Reagan had demonstrated symptoms of mental degeneration.
2. Reagan's doctors say that he only began exhibiting overt symptoms of the illness in late 1992 or 1993, several years after he had left office.
3. Reagan did experience occasional memory lapses, though, especially with names.
4. For example, Reagan repeated a toast to Margaret Thatcher, with identical words and gestures, at his 82nd-birthday party on February 6, 1993."
5. His former Chief of Staff James Baker considered '"' ludicrous '"' the idea that Reagan slept during cabinet meetings.
6. Other staff members, former aides, and friends said they saw no indication of Alzheimer's while he was president.
7. Dr. John E. Hutton, Reagan's primary physician from 1984 to 1989, said the president '"' absolutely '"' did not '"' show any signs of dementia or Alzheimer's '"'.
8. However, Dr. Lawrence K. Altman, a physician employed as a reporter for '"' The New York Times '"', noted that '"' the line between mere forgetfulness and the beginning of Alzheimer's can be fuzzy, '"' and all four of Reagan's White House doctors said that they saw no evidence of Alzheimer's while he was president.
9. Former CBS White House correspondent Lesley Stahl recounted that, in her final meeting with the president in 1986, Reagan did not seem to know who Stahl was, and that she came close to reporting that Reagan was senile, but at the end of the meeting, Reagan had regained his alertness.
10. although he later realized his mistake.
11. Not long after the attempted assassination of Ronald Reagan, at a reception for mayors, Reagan greeted his Secretary of Housing and Urban Development Samuel Pierce in 1981 by saying '"' How are you, Mr Mayor?
12. How are things in your city '"'?

SYSTEM AND METHOD FOR CROSS-DOMAIN TRANSFERABLE NEURAL COHERENCE MODEL

CROSS REFERENCE

This application is a non-provisional of, and claims all benefit, including priority, to Application No. 62/753,621, filed 31 Oct. 2018 (Ref.: 05007268-160USPR), entitled "SYSTEM AND METHOD FOR CROSS-DOMAIN TRANSFERABLE NEURAL COHERENCE MODEL", incorporated herein by reference.

FIELD

Embodiments of the present disclosure generally relate to the field of machine learning, and more specifically, embodiments relate to devices, systems and methods for cross-domain transferable coherence models.

INTRODUCTION

Coherence is a property of text about whether its parts are organized in a way that the overall meaning is expressed fluidly and clearly. Therefore, it is an important quality measure for text generated by humans or machines, and modelling coherence can benefit many applications, including summarization, question answering, essay scoring and text generation.

Coherence is an important aspect of discourse quality in text that is crucial for ensuring its readability, and previous work has shown how coherence models can be applied to sentence reordering tasks for natural language generation systems.

SUMMARY

Alternate approaches have been utilized for attempting to provide neural network models for coherence derivation. For example, approaches have utilized entity grid representations, as well as generative models. One disadvantage of generative models is that the models are adapted to maximize the likelihood of the training text but are not adapted to observe the incoherent text. In other words, to produce a binary classification decision about coherence, such a generative model only sees data from one class and not the other.

Driven by success in distributed word representations and deep neural networks, various models have been proposed to tackle the task of coherence in text. Coherence is an important aspect of text quality and is crucial for ensuring its readability. Uses for coherence analysis include, for example, automated summarization analysis, automated text insertion/re-construction/regeneration, among others. Low quality writing scores can be established at a preliminary level, which can be utilized for automatically triggering a rewrite, for example, by a machine learning mechanism, but with parameters adjusted. The rewrite can be analyzed to determine if it has a baseline readability score.

There are many different approaches to assessing coherence using computational approaches. However, the different approaches each have different technical strengths and limitations as the data model architecture and structure utilized by the computing platforms can vary. The different approaches can have differing levels of computational accuracy, processing resource requirements, among others.

Furthermore, the type and underlying data sets used in training is important. Adaptability and extensibility for usage for different input data sets is important, especially as it is difficult to predict what data sets the system will ultimately be used on. In this discussion, the topic of the data sets is described as a "domain". There can be different domains, and training cannot be practically done on all of them.

A drawback of many earlier approaches is a lack of domain transferability, especially as the domains have fewer relationships (e.g., are "further apart") from one another (e.g., very unrelated topics—trained on "plants" and then used for "astronomy").

Domain transferability is important as for many practical implementations, it is not feasible to have a priori knowledge of the domain in which a model is to be used with. There is a risk with machine learning models of "overfitting" to the training set such that the model is no longer extensible.

As described in further detail herein, one important limitation of existing coherence models is that training on one domain does not easily generalize to unseen categories of text. These coherence models can be categorized as either discriminative or generative. Discriminative models depend on contrastive learning and resort to negative sampling to generate incoherence passage of text, then learns to distinguish coherent passages from incoherent ones.

Due to the technical challenges of dimensionality, the negative sampling space grows exponentially when the length of the passage increases. The sampled instances can only cover a tiny proportion of the set of possible negative candidates, and therefore limits the achievable accuracy. The generative models aim at maximizing the likelihood of training text, which is assumed to be coherent, without seeing incoherent text or considering the objective of coherence.

The operating assumption behind many of these works is that coherence measures some property of a chunk of text as a whole, i.e., an article or a paragraph. Therefore, these models attempted to capture the global coherence directly from a chunk of text.

However, capturing long-term dependencies in sequences remains a fundamental challenge when training neural networks. Prior approaches are prone to overfitting on the specific domains and data sets in which they are defined for. A domain-specific approach as provided in prior approaches is not practical as costly retraining on every domain would be required.

On the other hand, a proposed approach described in various embodiments herein that utilizes an unconventional approach wherein global coherence is decomposed as the aggregation of local coherence.

Indeed, a focus of some embodiments described herein is that local coherence cues make up an essential part of global coherence, and previous methods failed to capture them fully. Applicants, in various experiments, have demonstrated that such is the case, and describe computer systems, methods, devices, and computer program products (e.g., machine interpretable instruction sets affixed into computer readable media). The system described herein combines aspects of generative and discriminative models to produce a system that works well in both in-domain and cross-domain settings, despite being a discriminative model overall.

In some embodiments, an improved approach is described using a local discriminative neural model that can exhaustively learn against all possible incorrect sentence orderings in a local window. The proposed coherence model significantly outperforms previous methods on a standard benchmark dataset on the Wall Street Journal™ corpus, as well as in open cross-domain settings of transfer to unseen categories of discourse.

The decomposability approximation of coherence enables models that take as inputs neighboring pairs of sentences, for which the space of negatives is much smaller and can be effectively covered by sampling other individual sentences in the same document.

Surprisingly, adequately modelling local coherence alone outperform previous approaches, and furthermore, local coherence captures text properties that are domain agnostic generalize much better in open domain to unseen categories of text. Applicants demonstrate that generatively pre-trained sentence encoders can further enhance the performance of the discriminative local coherence model.

Given a discriminative model with sufficient capacity, in order to train the model well, a sufficient number of pairs of positive and negative examples are provided to the model to have an opportunity to learn the probability distribution of the data well.

In case of discriminating coherent text from incoherent text, the space of possible negative examples are prohibitively large. In fact, for an article with n sentences, there are $n^n-1$ number of possible permutations of sentences that would each be a possible negative example. Therefore, it has been suggested that training discriminative models well would not be possible especially in the case of open domain coherence discrimination. Here, a strategy is described for effective training of discriminative models of coherence that successfully trains discriminative models by leveraging locality.

In a first aspect, a method of automatically generating a coherence score for a target text data object is provided. The method includes receiving a plurality of string tokens representing decomposed portions of the target text data object.

A trained neural network is provided that has been trained against a plurality of corpuses of training text across a plurality of topics (e.g., across a set of Wikipedia™ topics). The neural network is trained using string tokens of adjacent sentence pairs of the training text as positive examples and string tokens of non-adjacent sentence pairs of the training text as negative examples. The training of the neural network across a broad range of topics allows the neural network to generate local coherence scores that are not overfit to a particular topic.

The string tokens are arranged to extract string tokens representing adjacent sentence pairs of the target text data object. For each adjacent sentence pair, the method includes determining, using the neural network, a local coherence score representing a coherence level of the adjacent sentence pair of the target text data object.

The generated local coherence scores are aggregated for each adjacent sentence pair of the target text data object to generate a global coherence score for the target text data object, which is stored in a data storage (in some embodiments, along with the generated local coherence scores).

In another aspect, the neural network is configured for parallel operation, and wherein the determination using the neural network of each local coherence score is conducted across parallel computational pathways.

In another aspect, copies of the neural network are established for parallel operation of the neural network.

In another aspect, the parallel computational pathways include using different threads or cores of one or more processors.

In another aspect, the string tokens are real-valued vectors representing a first sentence s and a second sentence t, and wherein the neural network extracts features from each adjacent sentence pairs through applying representations to the real-valued vectors s and t that include at least one of (1) concatenation of the two vectors (s,t), (2) element-wise difference (s–t), (3) element-wise product (s*t), or absolute element-wise difference s–t $\vee$.

In another aspect, the concatenated feature representation of the two vectors is provided into a one-layer perceptron of the neural network to generate the local coherence score for the adjacent sentence pair.

In another aspect, the target text data object is an automatically generated summary or an original text data object, and the global coherence score is utilized in assessing a quality metric of summarization of the original text data object.

In another aspect, the method includes, responsive to the quality metric of summarization of the original text data object being determined to be below a pre-defined threshold, transmitting control signals adapted to initiate generation of a second automatically generated summary but with at least one different parameter than the original text data object.

In another aspect, the plurality of topics of the training text does not include a topic of the target text object. Where the range of the plurality of topics is sufficiently broad, the trained neural network should still be able to operate to generate local coherence scores despite the topic of the target text object not being explicitly within the range of the plurality of topics.

In another aspect, the plurality of topics of the training text includes a topic of the target text object.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 6A, 6B, 6C, 6D are string coherence score generation examples provided by an example implementation of an embodiment.

FIG. 7A, 7B, 7C, 7D, 7E, 7F, 7G, 7H are string reconstruction examples provided by an example implementation of an embodiment.

DETAILED DESCRIPTION

Figure 1:
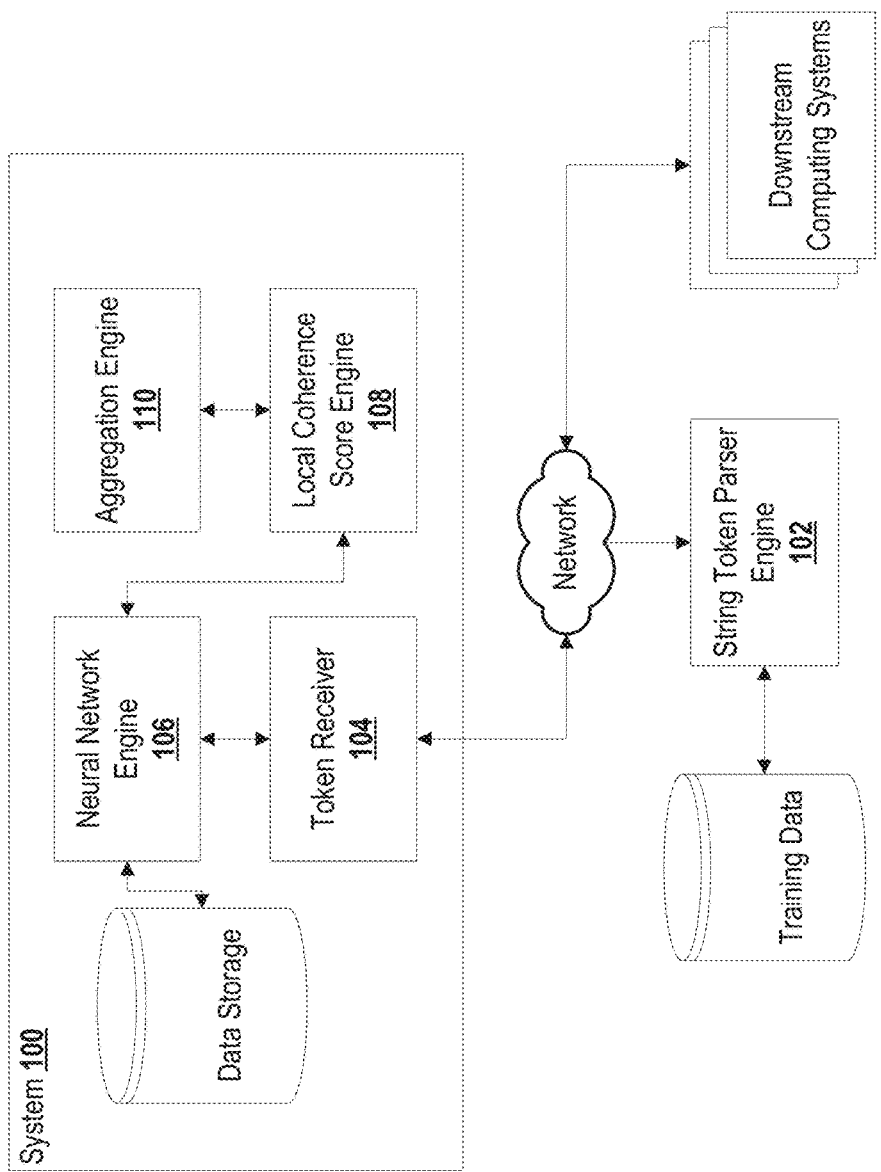
FIG. 1 is a block schematic diagram of an example system for automatically generating a coherence score, according to some embodiments.

As described in various embodiments, an improved approach for automatically estimating coherence of a target text object is described. While there are various different approaches attempting to estimate coherence, the embodiments described herein provide technical improvements in relation to transferability and ease of computation that is not exhibited in other approaches.

In this description, "passage" and "document" are used interchangeably since all the models under consideration work in the same way for a full document or a passage in document.

A deficiency of some other approaches (e.g., approaches that attempt to establish a global coherence level) includes a difficulty level of computation that scales non-linearly as the length of the passage of text grows, or becoming overfit to a particular topic or feature of the training set. Accordingly, these approaches have limitations on their practical use.

The described approach includes an unconventional approach wherein global coherence is decomposed as the aggregation of local coherence. Indeed, a focus of some embodiments described herein is that local coherence cues make up an essential part of global coherence, and previous methods failed to capture them fully. Applicants, in various experiments, have demonstrated that such is the case, and describe computer systems, methods, devices, and computer program products (e.g., machine interpretable instruction sets affixed into computer readable media).

As noted herein, the approach corrects the misconception that discriminative models cannot generalize well for cross-domain coherence scoring, with a novel local discriminative neural model. A set of cross-domain coherence datasets with increasingly difficult evaluation protocols is proposed, and as shown in experimental results, an example implementation of some embodiments indicates that method outperforms previous methods by a significant margin on both the previous closed domain WSJ dataset as well as on all open-domain ones. These results were obtained even with the simplest sentence encoder, averaged GloVe the example implementation frequently outperforms previous methods, and Applicant notes that the approach, in some embodiments, can gain further accuracy by using stronger encoders.

Other approaches described in other works include a neural clique-based discriminative model to compute the coherence score of a document by estimating a coherence probability for each clique of L sentences, or a neural entity grid model with convolutional neural network that operates over the entity grid representation. However, these methods rely on hand-crafted features derived from NLP preprocessing tools to enhance the original entity grid representation. The embodiments described herein take a different approach to feature engineering, focusing on the effect of supervised or unsupervised pre-training.

For example, another approach uses used an RNN based encoder-decoder architecture to model the coherence which can also be treated as the generative model. One obvious disadvantage of generative models is that they maximize the likelihood of training text but never see the incoherent text. In other words, to produce a binary classification decision about coherence, such a generative model only sees data from one class. As demonstrated later in the experiments, this puts generative models at a disadvantage comparing to the local discriminative model of some embodiments.

It is plausible that much of global coherence can be decomposed into a series of local decisions, as demonstrated by foundational theories such as Centering Theory. The hypothesis of proposed approaches investigated herein is that there remains much to be learned about local coherence cues which previous work has not fully captured and that these cues make up an essential part of global coherence, and this is demonstrated in the results using sample embodiments.

FIG. 1 is a block schematic diagram of an example system for automatically generating a coherence score, according to some embodiments. The system 100 is a computer system having one or more processors, computer memory, and data storages operating in concert.

The system 100 is configured for receiving a target text data object and processing the target text data object to automatically generate a global coherence score for the target text data object that is derived based on a set of local coherence scores that represent subdivisions of the initial technical problem.

The system 100 take neighboring pairs of sentences as inputs, for which the space of negatives is much smaller and can therefore be effectively covered by sampling other sentences in the same document.

The local coherence scores are generated for adjacent sentence pairs and aggregated to generate the global coherence score, which as described below, is an unconventional technical solution that provides benefits relative to alternate approaches. Surprisingly, adequately modelling local coherence alone significantly outperforms previous approaches, and furthermore, local coherence captures text properties that are domain-agnostic, generalizing much better in open-domain settings to unseen categories of text.

A plurality of string tokens from string token parser engine 102 at token receiver 104 representing decomposed portions of the target text data object. String tokens, in some embodiments, are grouped based on portions of individual sentences, and in some embodiments, tokens associated with a particular sentence are associated with an identifier such that the specific sentence can be identified. In an embodiment, the identifiers indicate the order in which the sentences are located in the target text data object (e.g., sentence 1, sentence 2, sentence 3).

The order in which the sentences are located can be utilized to establish adjacency. In an alternate embodiment, the identifiers are adapted only to indicate that two particular sentences are adjacent to one another. The string tokens, in some embodiments, are real-valued vectors representing a first sentence s and a second sentence t, and wherein the neural network extracts features from each adjacent sentence pairs through applying representations to the real-valued vectors s and t that include at least one of (1) concatenation of the two vectors (s,t), (2) element-wise difference (s−t), (3) element-wise product (s*t), or absolute element-wise difference s−t v.

A trained neural network is maintained by neural network engine 106, the neural network trained against a plurality of corpuses of training text across a plurality of topics (e.g., across a set of Wikipedia™ topics, such as actors, events, places, philosophy). The neural network engine 106 trains the neural network using string tokens of adjacent sentence pairs of the training text as positive examples and string tokens of non-adjacent sentence pairs of the training text as negative examples.

The training of the neural network across a broad range of topics allows the neural network to generate local coherence scores that are not overfit to a particular topic.

Accordingly, the superiority of previous generative approaches in cross-domain settings can be effectively incorporated into a discriminative model as a pre-training step. As described herein, generatively pre-trained sentence encoders enhance the performance of the discriminative local coherence model.

The string tokens are arranged to extract string tokens representing adjacent sentence pairs of the target text data object. For each adjacent sentence pair, a local coherence score engine 108 is adapted to, using the neural network, generate a local coherence score representing a coherence level of the adjacent sentence pair of the target text data object. In some embodiments, a parallelization engine 110 is provided that splits up each local coherence score to be determined and coordinates parallel computing across one or more processors having, in aggregate, a plurality of cores or threads.

The generated local coherence scores generated by local coherence score engine 108 are aggregated by aggregation engine 110 for each adjacent sentence pair of the target text data object to generate a global coherence score for the target text data object, which is stored in a data storage (in some embodiments, along with the generated local coherence scores).

As noted below, the approach is tested in accordance with some embodiments on the Wall Street Journal (WSJ) benchmark dataset, as well as on three challenging new evaluation protocols using different categories of articles drawn from Wikipedia that contain increasing levels of domain diversity. The discriminative model of some embodiments significantly outperforms strong baselines on all datasets tested. Finally, hypothesis testing shows that the coherence scores from the model have a significant statistical association with the "rewrite" flag for regular length Wikipedia articles, demonstrating that the model prediction aligns with human judgement of text quality.

The system 100 can be utilized as a machine learning mechanism for outputting data sets storing as data values coherence scores. The system 100 is trained prior to usage, and in some embodiments, a specific trained model is stored on non-transitory computer readable media as a set of machine executable instructions in relation to a trained function. The trained model, in some embodiments, can then be provided to downstream systems for usage or execution, for example, for storage on mobile devices to check coherence of written messages or notes stored thereon.

The trained model is a data architecture having a stored representation of nodes and interconnections represented as data objects. The interrelationships are represented in the interconnections, which, for example, could be database values storing relationship strengths, the presence of a relationship, among others. The training can be done with positive or negative examples, or both, as described in various embodiments herein, and reward functions or other optimization functions can be used to modify how the model evolves with each training epoch.

The system 100 can be utilized as a coherence checking device that may form part of a larger system in relation to string/text document processing. In an embodiment, system 100 is utilized to assess automatically generated documents (e.g., automatically generated analyst report for a financial institution) for readability, and if the score is not sufficiently high, a new document is requested to be generated, albeit with different generation parameters. In another embodiment, system 100 is configured to couple with a textual database, such as a wiki or a crowdsourced database, and automatically flag articles in which the score is low (e.g., automatically establishing re-write flags). In another embodiment, system 100 is utilized for assessing human-written text, for example, in the context of a learning environment or language skills development.

The output is not necessarily the coherence score. In some embodiments, the output is a re-constructed or re-arranged textual document, for example, where an insertion has taken place. The system 100 may utilize the coherence score in identifying a position in which the insertion would be most coherent. The system 100 can also be utilized for re-arranging specific strings or suggesting rearrangements within a document by conducting a search across different candidate rearrangements and identifying the candidate having the highest score.

Figure 2:
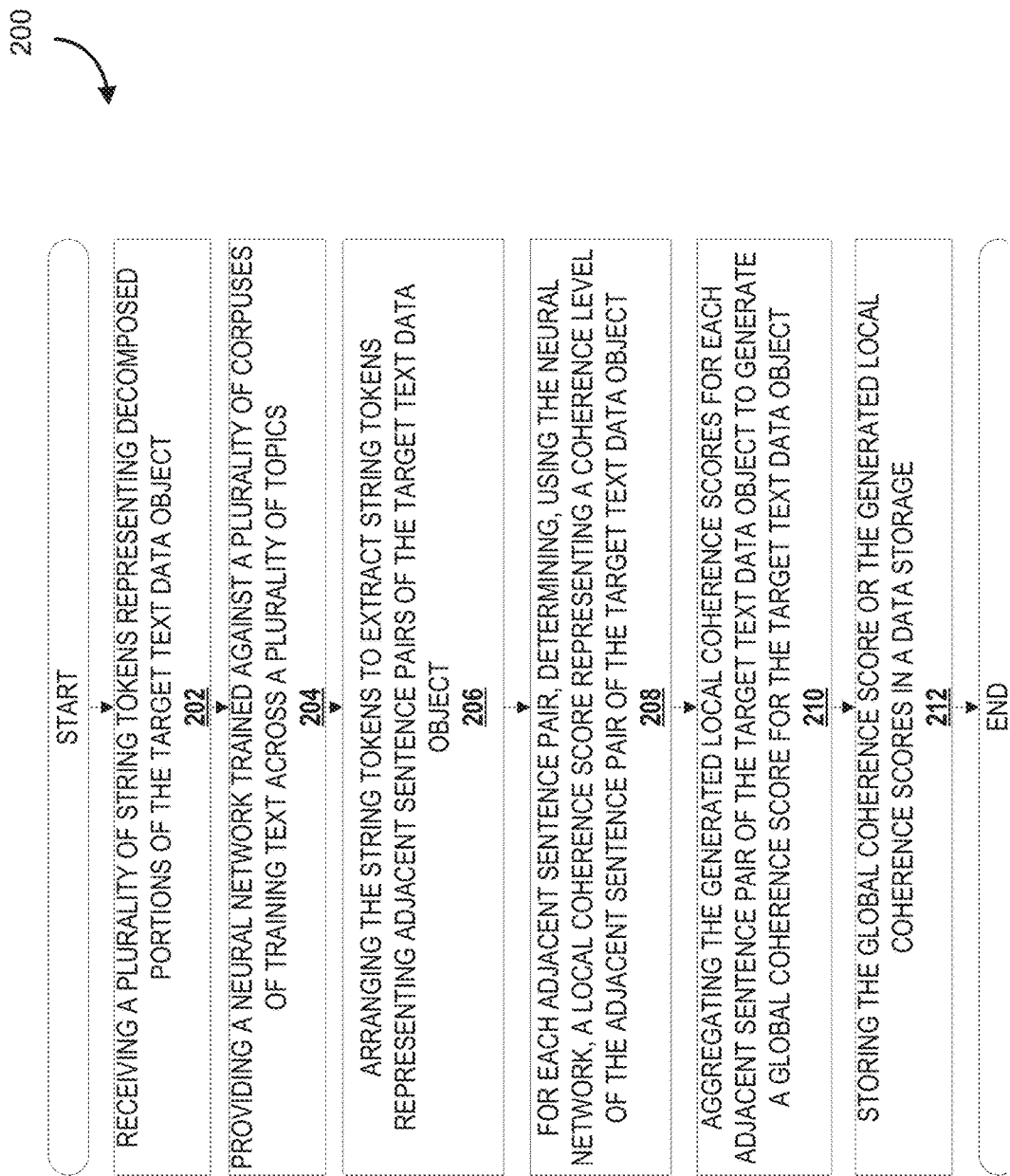
FIG. 2 is an example method for automatically generating a coherence score, according to some embodiments.

FIG. 2 is an example method for automatically generating a coherence score, according to some embodiments. The method 200 can be modified and is provided as a non-limiting example, and there can be more steps, less steps, alternate steps, steps in different orders, combinations, or permutations.

At 202, a plurality of string tokens are received representing decomposed portions of the target text data object.

At 204, a neural network trained against a plurality of corpuses of training text across a plurality of topics is provided, the neural network trained using string tokens of adjacent sentence pairs of the training text as positive examples and string tokens of non-adjacent sentence pairs of the training text as negative examples.

At 206, the string tokens are arranged to extract string tokens representing adjacent sentence pairs of the target text data object.

At 208, for each adjacent sentence pair, the neural network processes the string tokens to generate a local coherence score representing a coherence level of the adjacent sentence pair of the target text data object.

At 210, the generated local coherence scores are aggregated for each adjacent sentence pair of the target text data object to generate a global coherence score for the target text data object.

At 212, the global coherence score or the generated local coherence scores is recorded in a data storage.

Notations

The input is a corpus $C=\{d_i\}_{i=1}^{N}$ which consists of N documents. Each document $d_i$ is comprised of a sequence of sentences $\{s_1, \ldots, s_{l_i}\}$ where $l_i$ is the number of sentences in the document.

The standard task used to test a coherence model in NLP is sentence ordering, for example, to distinguish between a coherently ordered list of sentences and a random permutation thereof.

One key decision which forms the foundation of a model is whether it is discriminative or generative. Discriminative models depend on contrastive learning; they use automatic corruption methods to generate incoherent passages of text, then learn to distinguish coherent passages from incoherent ones. By contrast, generative approaches aim at maximizing the likelihood of the training text, which is assumed to be coherent, without seeing incoherent text or explicitly incorporating coherence into the optimization objective.

As described herein, a solution to the above problems is provided by some embodiments by providing a computational approach that combines aspects of generative and discriminative models to produce a system that works well in both in-domain and cross-domain settings, despite being a discriminative model overall.

The notation is described below to aid the reader.

Document-Level Discriminative Models

Generally, discriminative models attempting to capture the document-level information seek to find model parameters $\theta$ that assigns a higher coherence score to $d_i$ than random permutations of its sentences.

The set of all random permutations is indicated by $D_i$. The problem can be formulated to minimize the following objective with some loss function L with respect to θ:

$$\min_\theta \Sigma^{d_i \in C}(d_i, d_j; \theta).$$

However, it is impractical to enumerate over $D_i$ when $l_i$ is large. As a compromise, a small subset of $D_i$ can be chosen during training.

Generative Models

Generative models are based on the hypothesis that the next sentences should be guessed properly given the preceding sentences and vice versa in a coherent context. Basically, they try to maximize the log-likelihood directly as follows (with some variations according to the specific model):

$$\max_\theta \Sigma_{d \in C} \Sigma_{s \in d} \log p(s \mid c_s; \theta), \quad (1)$$

where $c_s$ is the context of the sentence s. $c_s$ can be chosen as the next or previous sentence, or all the previous sentences. Instead of measuring coherence score directly, these models use the log-likelihood $p(s_i \lor s_{i+1})$ as the coherence score. However, the generation likelihood can be influenced by not only coherence of the context but also other factors like fluency, grammar and so on.

There are two hidden assumptions behind this maximum likelihood approach to coherence. First, it assumes that conditional log likelihood is a good proxy for coherence. Second, it assumes that training can well capture the long-range dependencies implied by the generative model.

Conditional log likelihood essentially measures the compressibility of a sentence given the context; i.e., how predictable s is given cs. However, although incoherent next sentence is generally not predictable given the context, the inverse is not necessarily true. In other words, a coherent sentence does not need to have high conditional loglikelihood, as log likelihood can also be influenced by other factors such as fluency, grammaticality, sentence length, and the frequency of words in a sentence. Second, capturing long-range dependencies in neural sequence models is still an active area of research with many challenges, hence there is no guarantee that maximum likelihood learning can faithfully capture the inductive bias behind the first assumption.

Task Decomposition

In order to exploit the advantages and overcome the drawbacks of the previous approaches, various embodiments adopt an effective objective which decomposes the global discriminative task into multiple local tasks.

Instead of a whole document, the model assigns a coherence score to a sentence pair. The coherence score of a document is thus the average coherence score of all the consecutive sentence pairs. In this case, all the other sentences in the document combined with one sentence in the original sentence pair can be treated as the negative samples. For a document with n sentences, there are (n−1)*(n−2) negative samples which is not that large and can be enumerated exhaustively during training.

In some embodiments, the proposed approach assigns a higher coherence score to a ordered sentence pair than a random sentence pair which can be formulated to minimize the following objective:

$$\min_\theta \Sigma^{d \in C}(s_i, s_{i+1}, s_j; \theta)$$

where j doesn't equal to i or i+1.

Local Discriminative Model of Some Embodiments

In an embodiment, a local coherence discriminator model (LCD) is proposed whose operating assumption is that the global coherence of a document can be well approximated by the average of coherence scores between consecutive pairs of sentences.

Experimental results later will validate the appropriateness of this assumption. For now, this simplification allows one to cast the learning problem as discriminating consecutive sentence pairs ($s_i$, $s_{i+1}$) in the training documents (assumed to be coherent) from incoherent ones ($s_i$, s') (negative pairs to be constructed).

Training objective: Formally, the discriminative model $f_\theta(.,.)$ takes a sentence pair and returns a score. The higher the score, the more coherent the input pair. Then the training objective is:

$$\mathcal{L}(\theta) = \Sigma_{d \in C} \ \Sigma_{s_i \in d} \ \mathbb{E}_{p(s'|s_i)} [L(f_\theta(s_i, s_{i+1}), f_\theta(s_i, s'))] \quad (2)$$

where $\mathbb{E}_{p(s'|s_i)}$ denotes expectation with respect to negative sampling distribution p which could be conditioned on $s_i$; and L(.,.) is a loss function that takes two scores, one for a positive pair and one for a negative sentence pair.

Loss function: The role of the loss function is to encourage $f^+ = f_\theta(s_i, s_{i+1})$ to be high while $f^- = f_\theta(s_i, s')$ to be low. Common losses such as margin or log loss can all be used. Through experimental validation, we found that margin loss to be superior for this problem. Specifically, L takes on the form: $L(f^+, f^-) = \max(0, \eta - f^+ + f^-)$ where η is the margin hyperparameter.

Negative samples: Technically, we are free to choose any sentence s' to form a negative pair with $s_i$. However, because of potential differences in genre, topic and writing style, such negatives might cause the discriminative model to learn cues unrelated to coherence. Therefore, we only select sentences from the same document to construct negative pairs. Specifically, suppose $s_i$ comes from document $d_k$ with length $n_k$, then $p(s'|s_i)$ is a uniform distribution over the $n_k-1$ sentences $\{s_j\}_{j \neq i}$ from $d_k$. For a document with n sentences, there are n−1 positive pairs, and (n−1)*(n−2)/2 negative pairs. It turns out that the quadratic number of negatives provides a rich enough learning signal, while at the same time, is not too prohibitively large to be effectively covered by a sampling procedure. In practice, we sample a new set of negatives each time we see a document, hence after many epochs, we can effectively cover the space for even very long documents. Section 5.7 discusses further details on sampling.

Model Architecture

Figure 3:
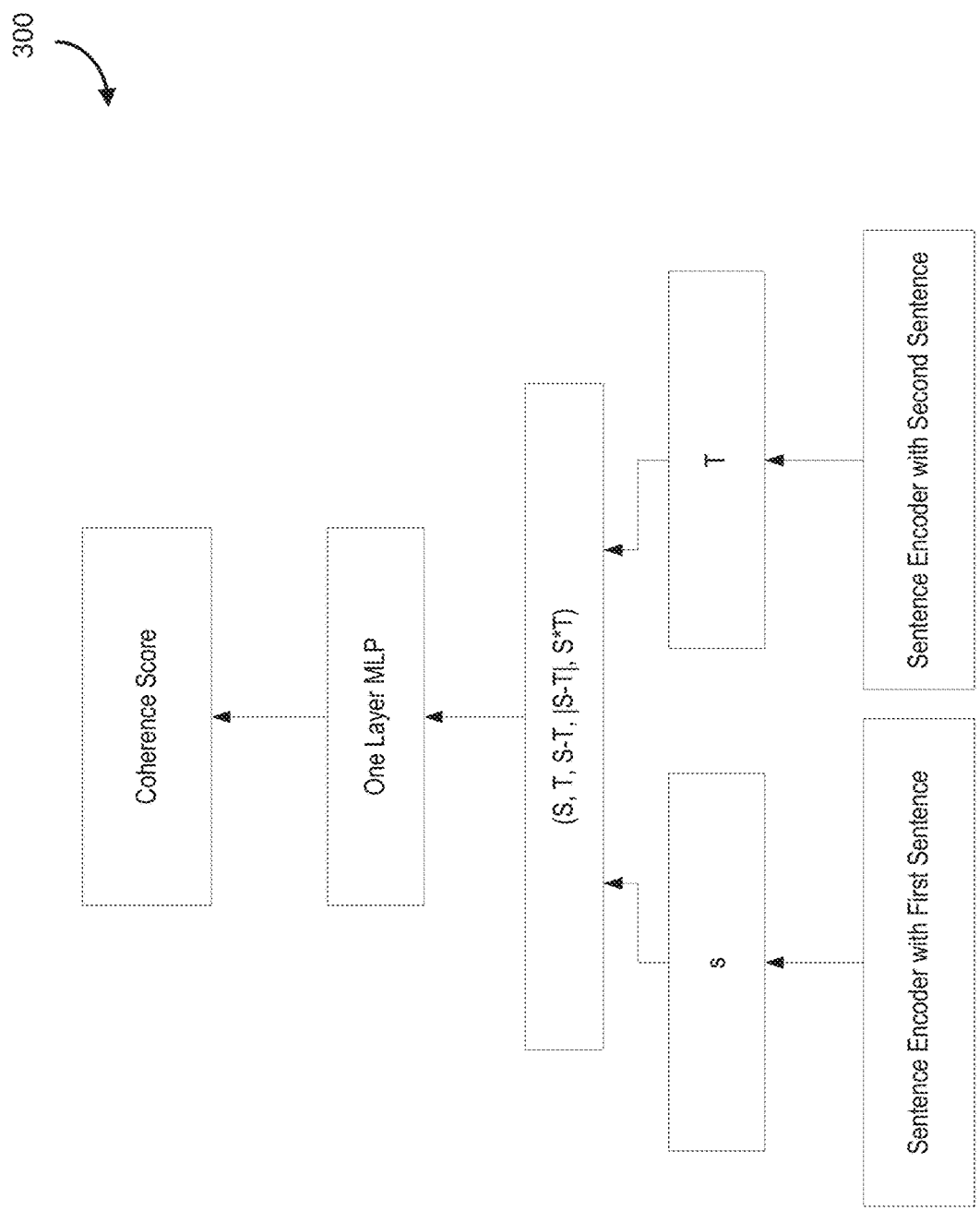
FIG. 3 is an example diagram of a neural networking model, according to some embodiments.

A neural model is proposed for $f_\theta$, as illustrated in FIG. 3. The input is two ordered sentences s, t and another sentence t' in the same document.

First, the approach includes transforming the sentences into real-valued vectors with some sentence encoder. Given an input sentence pair, the sentence encoder maps the sentences to real-valued vectors S and T.

The following representations are applied to extract features between two sentences s and t: (1) concatenation of the two vectors (s,t); (2) element-wise difference s−t; (3) element-wise product s*t; (4) absolute element-wise difference |S−T|. The concatenated feature representation is fed to a one-layer perceptron to get the coherence score.

Example Architecture for a Proposed Model

In practice, there are two identical perceptrons $f(.,.; \theta_f)$ and $g(.,.; \theta_g)$ which yields the following coherence score:

$$L(s,t;\theta_f,\theta_g)=f(s,t;\theta_f)+g(t,s;\theta_g)$$

Then, the loss function is defined as follows:

$$L(s,t,\tilde{t};\theta_f,\theta_g)=[M-L(s,t)+L(s,\tilde{t})]_+$$

where M is the margin and $[\cdot]_+$ represents clipping to 0 as $[a]_+ \max(a, 0)$.

In practice, the overall coherence model can be bidirectional by training a forward model with input (S,T) and a backward model with input (T,S) with the same architecture but separate parameters. The coherence score is then the average from the two models.

Pre-Trained Generative Model as the Sentence Encoder

One component of the proposed approach of some embodiments is the sentence encoder. A pre-trained sentence encoder can be used or an alternate approach is to simply averaging the word representations in the sentence as the encoder. The approach can use the hidden state of pre-trained generative models as the sentence encoder directly to leverage the advantages of both the generative models and the proposed learning mechanism.

The mechanism described can work with various pre-trained sentence encoders, ranging from the most simplistic average GloVe embeddings to more sophisticated supervised or unsupervised pre-trained sentence encoders. Since generative models can often be turned into sentence encoder, generative coherence model can be leveraged by the model to benefit from the advantages of both generative and discriminative training. After initialization, the generative model parameters can be frozen to avoid overfitting. As shown later in this disclosure, Applicants experimentally show that while there is benefit from strong pre-trained encoders, the fact that the local discriminative model improves over previous methods is independent of the choice of sentence encoder.

Convolutional Variant of the Proposed Approach

Given an article, the model assigns a set of scores to the set of all overlapping pairs of consecutive sentences in the article. The average of these local scores are used as the coherence score of an article. The proposed model consists of several layers:

an embedding layer, mapping the sequence of tokens in a sentence $T^i=\{t_1, t_2, \ldots t_l\}$ to a vector representation $s_i \in R^m$.

a feature layer mapping each pair of sentences $s_i$, $s_j \in R^m$ to a feature space $f_{i,j} \in R^{2*m*h}$.

a one-dimensional convolution operation with kernel size of two that calculates the dot product between a set of K weight vectors $m_k \in R^{2*m*h}$ and each feature vector $f_{i,j} \in R^{2*m*h}$ to obtain an intermediate representation of a pair of sentences $a_{i,j} \in R^K$.

and a linear transformation that maps the intermediate representations $a_{i,j} \in R^K$ to a single coherence score scored for a pair of input sentences.

Since the field of view of the model is restricted to two sentences at a time, the set of possible negative examples for an article of length n, is calculated as (n−1)(n−2) which is a much more manageable number than the set of all possible article-level negative examples. Therefore, it is possible to provide training examples that effectively cover a large proportion of the space of possible negative examples and thus effectively train a local discriminative model.

Training Procedure

An example training procedure, according to some embodiments, involves the construction of a set of negative examples coupled with their corresponding positive pairs of sentences from the article. Two strategies for producing the negative examples are described in examples but others are possible. The first strategy which is denoted NCE negative sampling, involves the formation of a number of random shuffling of an article. The convolutional model then goes through the article and its negative samples assigning a score to all consecutive pairs of sentences. These scores are then passed on to a margin loss function that strives to encourage the model to assign low scores to positive pairs of sentences and a high score to negative pairs of sentences.

In the second negative sampling strategy which denoted by the term bigram (or paired) sampling, one constructs the set of all possible negative samples in an article for all pair of sentences in the article. Then the approach includes randomly sampling a fixed number of negative pairs from this pool of negative examples (with replacement). Repeat this procedure for all consecutive pairs of sentences in an article (positive samples).

Experiments

Evaluation Tasks

Models are evaluated on the discrimination and insertion tasks. Additionally, Applicants evaluate on the paragraph reconstruction task in open-domain settings.

In the discrimination task, a document is compared to a random permutation of its sentences, and the model is considered correct if it scores the original document higher than the permuted one. Twenty permutations are used in the test set in accordance with previous work.

In the insertion task, Applicants evaluate models based on their ability to find the correct position of a sentence that has been removed from a document. To measure this, each sentence in a given document is relocated to every possible position. An insertion position is selected for which the model gives the highest coherence score to the document. The insertion score is then computed as the average fraction of sentences per document reinserted into their original position.

In the reconstruction task, the goal is to recover the original correct order of a shuffled paragraph given the starting sentence. Applicants use beam search to drive the reconstruction process, with the different coherence models serving as the selection mechanism for beam search. Applicants evaluate the performance of different models based on the rank correlation achieved by the top-1 reconstruction after search, averaged across different paragraphs.

For longer documents, since a random permutation is likely to be different than the original one at many places, the discrimination task is easy. Insertion is much more difficult since the candidate documents differ only by the position of one sentence. Reconstruction is also hard because small errors accumulate.

Datasets and Protocols

Closed-Domain

The single-C domain evaluation protocol is done on the Wall Street Journal (WSJ) portion of Penn Treebank (Table 2).

Open-Domain li2017neural first proposed open-domain evaluation for coherence modelling using Wikipedia articles, but did not release the dataset.

Hence, Applicants create a new dataset based on Wikipedia and design three cross-domain evaluation protocols with increasing levels of difficulty. Based on the ontology defined by DBpedia, Applicants choose seven different categories under the domain Person and three other categories from irrelevant domains.

Applicants parse all the articles in these categories and extract paragraphs with more than 10 sentences to be used as the passages for training and evaluation. The statistics of this dataset is summarized in Table 1. The three settings with increasing level of hardness are as follows:
1. Wiki-A(rticle) randomly split all paragraphs of the seven categories under Person into training part and testing part;
2. Wiki-C(ategory) hold out paragraphs in one category from Person for evaluation and train on the remaining categories in Person;
3. Wiki-D(omain) train on all seven categories in Person, and evaluate on completely different domains, such as Plant, Institution, CelestialBody, and even WSJ.

Wiki-A setting is an open domain evaluation. Importantly, there is no distribution drift (up to sampling noise) between training and testing. Thus, this protocol only tests whether the coherence model is able to capture a rich enough set of signal for coherence, and does not check whether the learned cues are specific to the domain, or generic semantic signals.

For example, cues based on style or regularities in discourse structure may not generalize to different domains. Therefore, Applicants designed the much harder Wiki-C and Wiki-D to check whether the coherence models capture cross-domain transferrable features. In particular, in the Wiki-D setting, Applicants even test whether the models trained on Person articles from Wikipedia generalize to WSJ articles.

TABLE 1

Statistics of the Wiki Dataset.

| Domain | Category | # Paras | Avg. # Sen. |
|---|---|---|---|
| Person | Artist | 9553 | 11.87 |
| | Athlete | 23670 | 12.26 |
| | Politician | 2420 | 11.62 |
| | Writer | 3310 | 11.83 |

TABLE 1-continued

Statistics of the Wiki Dataset.

| Domain | Category | # Paras | Avg. # Sen. |
|---|---|---|---|
| | MilitaryPerson | 6428 | 11.90 |
| | OfficeHolder | 6578 | 11.54 |
| | Scientist | 2766 | 11.77 |
| Species | Plant | 3100 | 12.26 |
| Organization | Institution | 5855 | 11.58 |
| Place | CelestialBody | 414 | 11.55 |

Baselines

Applicants compared the proposed model LCD against two document-level discriminative models: (1) Clique-based discriminator Clique-Discr. with window size 3 and 7. (2) Neural entity grid model Grid-CNN and Extended Grid-CNN; and three generative models: (3) Seq2Seq; (4) Vae-Seq2Seq; (5) LM, an RNN language model, and used the difference between conditional log likelihood of a sentence given its preceding context, and the marginal log likelihood of the sentence. All the results are based on the own implementations except Grid-CNN and Extended Grid-CNN, for which Applicants used code from the authors.

Applicants compare these baselines to the proposed model with three different encoders:
1. LCD-G: use averaged GloVe vectors as the sentence representation;
2. LCD-I: use pre-trained InferSent as the sentence encoder;
3. LCD-L: apply max-pooling on the hidden state of the language model to get the sentence representation.

Results on Domain-Specific Data

TABLE 2

Accuracy of Discrimination and Insertion tasks evaluated on WSJ. For Grid-CNN and Extended Grid-CNN, the numbers outside brackets are taken from the corresponding paper, and numbers shown in the bracket are based on the experiments with the code released by the authors.

| | DISCR. | INS. |
|---|---|---|
| CLIQUE-DISCR. (3) | 70.91 | 11.53 |
| CLIQUE-DISCR. (7) | 70.30 | 5.01 |
| GRID-CNN | 85.57(85.13) | 23.12 |
| EXTENDED GRID-CNN | 88.69(87.51) | 25.95 |
| SEQ2SEQ | 86.95 | 27.28 |
| VAE-SEQ2SEQ | 87.01 | 26.73 |
| LM | 86.50 | 26.33 |
| LCD -G | 92.51 | 30.30 |
| LCD -I | 94.54 | 32.34 |
| LCD -L | 95.49 | 33.79 |

Applicants first evaluate the proposed models on the Wall Street Journal (WSJ) portion of Penn Treebank (Table 2). The proposed models perform significantly better than all other baselines, even if Applicants use the most naïve sentence encoder, i.e., averaged GloVe vectors. Among all the sentence encoders, LM trained on the local data in an unsupervised fashion performs the best, better than InferSent trained on a much larger corpus with supervised learning. In addition, combining the generative model LM with the proposed architecture as the sentence encoder improves the performance significantly over the generative model alone.

Results on Open-Domain Data

TABLE 3

Accuracy of discrimination task under Wiki-A

| | |
|---|---|
| CLIQUE-DISCR. (3) | 76.17 |
| CLIQUE-DISCR. (7) | 73.86 |
| SEQ2SEQ | 86.63 |
| VAE-SEQ2SEQ | 82.40 |
| LM | 93.83 |
| LCD -G | 91.32 |
| LCD -I | 94.01 |
| LCD -L | 96.01 |

TABLE 4

Accuracy of discrimination task under Wiki-C setting.

| Model | Artist | Athlete | Politician | Writer | Military-Person | Office-Holder | Scientist | Average |
|---|---|---|---|---|---|---|---|---|
| CLIQUE-DISCR. (3) | 73.01 | 68.90 | 73.82 | 73.28 | 72.86 | 73.74 | 74.56 | 72.88 |
| CLIQUE-DISCR. (7) | 71.26 | 66.56 | 73.72 | 72.01 | 72.67 | 72.62 | 71.86 | 71.53 |
| SEQ2SEQ | 82.72 | 73.45 | 84.88 | 85.99 | 81.40 | 83.25 | 85.27 | 82.42 |
| VAE-SEQ2SEQ | 82.58 | 74.14 | 84.70 | 84.94 | 81.07 | 82.66 | 85.09 | 82.17 |
| LM | 88.18 | 78.79 | 88.95 | 90.68 | 87.02 | 87.35 | 91.92 | 87.56 |
| LCD-G | 89.66 | 86.06 | 90.98 | 90.26 | 89.23 | 89.86 | 90.64 | 89.53 |
| LCD-I | 92.14 | 89.03 | 93.23 | 92.07 | 91.63 | 92.39 | 93.03 | 91.93 |
| LCD-L | 93.54 | 90.13 | 94.04 | 93.68 | 93.20 | 93.01 | 94.81 | 93.20 |

TABLE 5

Accuracy of discrimination task under Wiki-D setting.

| Model | Plant | Institution | Celestial-Body | Wsj | Average |
|---|---|---|---|---|---|
| CLIQUE-DISCR. (3) | 66.14 | 66.51 | 60.38 | 64.71 | 64.44 |
| CLIQUE-DISCR. (7) | 65.47 | 69.14 | 61.44 | 66.66 | 65.68 |
| SEQ2SEQ | 82.58 | 80.86 | 69.44 | 74.62 | 76.88 |
| VAE-SEQ2SEQ | 81.90 | 78.00 | 69.10 | 73.27 | 75.57 |
| LM | 81.88 | 83.82 | 74.78 | 79.78 | 80.07 |
| LCD -G | 86.57 | 86.10 | 79.16 | 82.51 | 83.59 |
| LCD -I | 89.07 | 88.58 | 80.41 | 83.27 | 85.33 |
| LCD -L | 88.83 | 89.46 | 81.31 | 82.23 | 85.48 |

Applicants next present results in the more challenging open-domain settings. Tables 3, 4, and 5 present results on the discriminative task under the Wiki-A, Wiki-C, Wiki-D settings. Applicants do not report results of the neural entity grid models, since these models heavily depend on rich linguistics features from a preprocessing pipeline, but Applicants cannot obtain these features on the Wiki datasets with high enough accuracy using standard preprocessing tools.

As in the closed-domain setting, the proposed models outperform all the baselines for almost all tasks even with the averaged GloVe vectors as the sentence encoder. Generally, LCD-L performs better than LCD-I, but their performances are comparable under Wiki-D setting. This result may be caused by the fact that InferSent is pre-trained on a much larger dataset in a supervised way, and generalizes better to unseen domains.

The generative models perform quite well under this setting and applying them on top of the proposed architecture as the sentence encoder further enhances their performances, as illustrated in Table 3.

However, as observed in Tables 4 and 5, the generative models do not generalize as well into unseen categories, and perform even worse in unseen domains.

Applicants emphasize that a protocol like Wiki-A or similar setup considered in li2017neural is insufficient for evaluating open domain performance. Because difficulties in open domain coherence modelling lie not only in the variety of style and content in the dataset, but also in the fact that training set cannot cover all potential variation there is in the wild, making cross domain generalization a critical requirement.

Paragraph Order Reconstruction Results

TABLE 6

Kendall's tau for re-ordering on Wiki-A/-D

| Model | Wiki-D (Celestialbody) | Wiki-A |
|---|---|---|
| SEQ2SEQ | 0.2104 | 0.2119 |
| LM | 0.1656 | 0.1420 |
| LCD -I | 0.2507 | 0.2744 |
| LCD -L | 0.2326 | 0.2900 |

As shown by the discrimination and insertion tasks, Seq2Seq and LM are the stronger baselines, so for paragraph reconstruction, Applicants compare the method to them, on two cross domain settings, the simpler Wiki-A and the harder Wiki-D. Applicants report the reconstruction quality via Kendall's tau rank correlation in Table 6, which shows that the method is superior by a significant margin.

Hyperparameter Setting and Implementation Details

In this discussion, Applicants search through different hyperparameter settings by tuning on the development data of the WSJ dataset, then apply the same setting across all the datasets and protocols. The fact that one set of hyperparameters tuned on the closed-domain setting works across all protocols, including open-domain ones, demonstrates the robustness of the method.

The following hyperparameter settings are chosen: Adam optimizer with default settings and learning rate 0.001, and no weight decay; the number of hidden state $d_h$ for the one-layer MLP as 500, input dropout probability p, as 0.6, hidden dropout probability $p_h$ as 0.3; the margin loss was found to be superior to log loss, and margin of 5.0 was selected. In addition, Applicants use early-stopping based on validation accuracy in all runs.

Furthermore, during training, every time Applicants encounter a document, Applicants sample 50 triplets ($s_i$, $s_{i+1}$, s')'s, where ($s_i$, $s_{i+1}$)'s form positive pairs while ($s_i$, s')'s form negative pairs. So effectively, Applicants resample sentences so that documents are trained for the same number of steps regardless of the length. For all the documents including the permuted ones, Applicants add two special tokens to indicate the start and the end of the document.

Analysis

Ablation Study

To better understand how different design choices affect the performance of the model, Applicants present the results of an ablation study using variants of the best-performing models in Table 7. The protocol used for this study is Wiki-D with CelestialBody and Wiki-WSJ, the two most challenging datasets in all of the evaluations.

The first variant uses a unidirectional model instead of the default bidirectional mode with two separately trained models. The second variant only uses the concatenation of the two sentence representations as the features instead of the full feature representation described earlier.

TABLE 7

Ablation study: Discr. under Wiki-D

| Model | Celestialbody | Wiki-Wsj |
|---|---|---|
| LCD -L | 81.31 | 82.23 |
| NO BIDIRECTIONAL | 80.33 | 82.30 |
| NO EXTRA FEATURES | 79.28 | 79.84 |

As it is shown, even the ablated models still outperform the baselines, though performance drops slightly compared to the full model. This demonstrates the effectiveness of the framework for modelling coherence.

Effect of Sample Coverage

FIG. 6 is a diagram 600 that shows the discrimination accuracy on CelestialBody and Wiki-WSJ with different portions of all valid samples. The x axis is in log-scale.

There are concerns that negative sampling cannot effectively cover the space of negatives for discriminative learning. FIG. 6 shows that for the local discriminative model, there is a diminishing return when considering greater coverage beyond certain point (20% on these datasets). Hence, the sampling strategy is more than sufficient to provide good coverage for training.

Comparison with Human Judgement

To evaluate how well the coherence model aligns with human judgements of text quality, Applicants compare the coherence score to Wikipedia's article-level "rewrite" flags. This flag is used for articles that do not adhere to Wikipedia's style guidelines, which could be due to other reasons besides text coherence, so this is an imperfect proxy metric. Nevertheless, Applicants aim to demonstrate a potential correlation here, because carelessly written articles are likely to be both incoherent and in violation of style guidelines. This setup is much more challenging than previous evaluations of coherence models, as it requires the comparison of two articles that could be on very different topics.

For evaluation, Applicants attempted to verify whether there is a difference in average coherence between articles marked for rewrite and articles that are not. Applicants selected articles marked with an article-level rewrite flag from Wikipedia, and Applicants sampled the non-rewrite articles randomly. Applicants then chose articles that have a minimum of two paragraphs with at least two sentences.

Applicants used the model trained for the Wiki-D protocol, and average its output scores per paragraph, then average these paragraph scores to obtain article-level scores. This two-step process ensures that all paragraphs contribute roughly equally to the final coherence score. Applicants then performed a one-tailed t-test for the mean coherence scores between the rewrite and no-rewrite groups.

Applicants found that among articles of a typical length between 2,000 to 6,000 characters (Wikipedia average length c. 2,800 characters), the average coherence scores are 0.56 (marked for rewrite) vs. 0.79 (not marked) with a p-value of 0.008. For longer articles of 8,000 to 14,000 characters, the score gap is smaller (0.60 vs 0.64), and p-value is 0.250. It is possible that in the longer marked article, only a subportion of the article is incoherent, or that other stylistic factors play a larger role, which the simple averaging does not capture well.

In this description, Applicants examined the limitations of two frameworks for coherence modelling; i.e., passage-level discriminative models and generative models.

Applicants propose an effective local discriminative neural model which retains the advantages of generative models while addressing the limitations of both kinds of models. Experimental results on a wide range of tasks and datasets demonstrate that the proposed model outperforms previous state-of-the-art methods significantly and consistently on both domain-specific and open-domain datasets.

Figure 4:
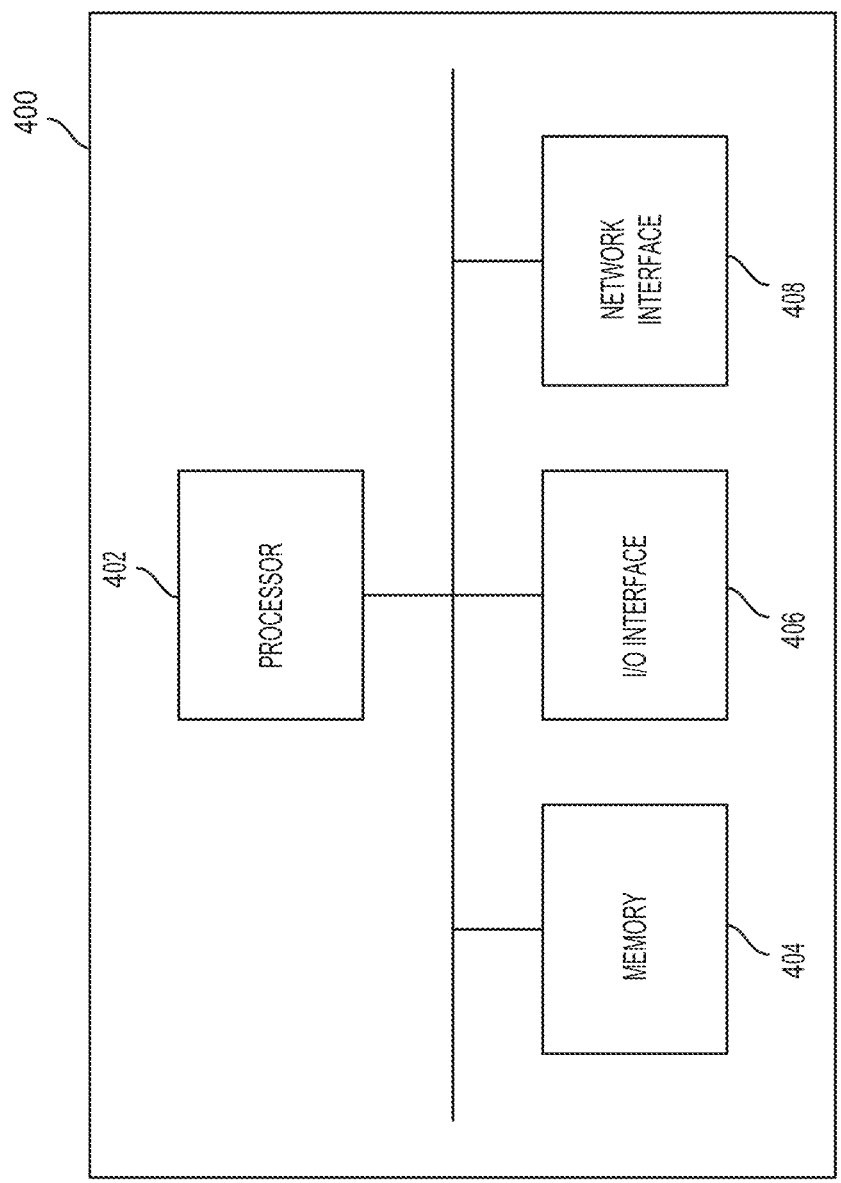
FIG. 4 is an example computing system, according to some embodiments.
Figure 5:
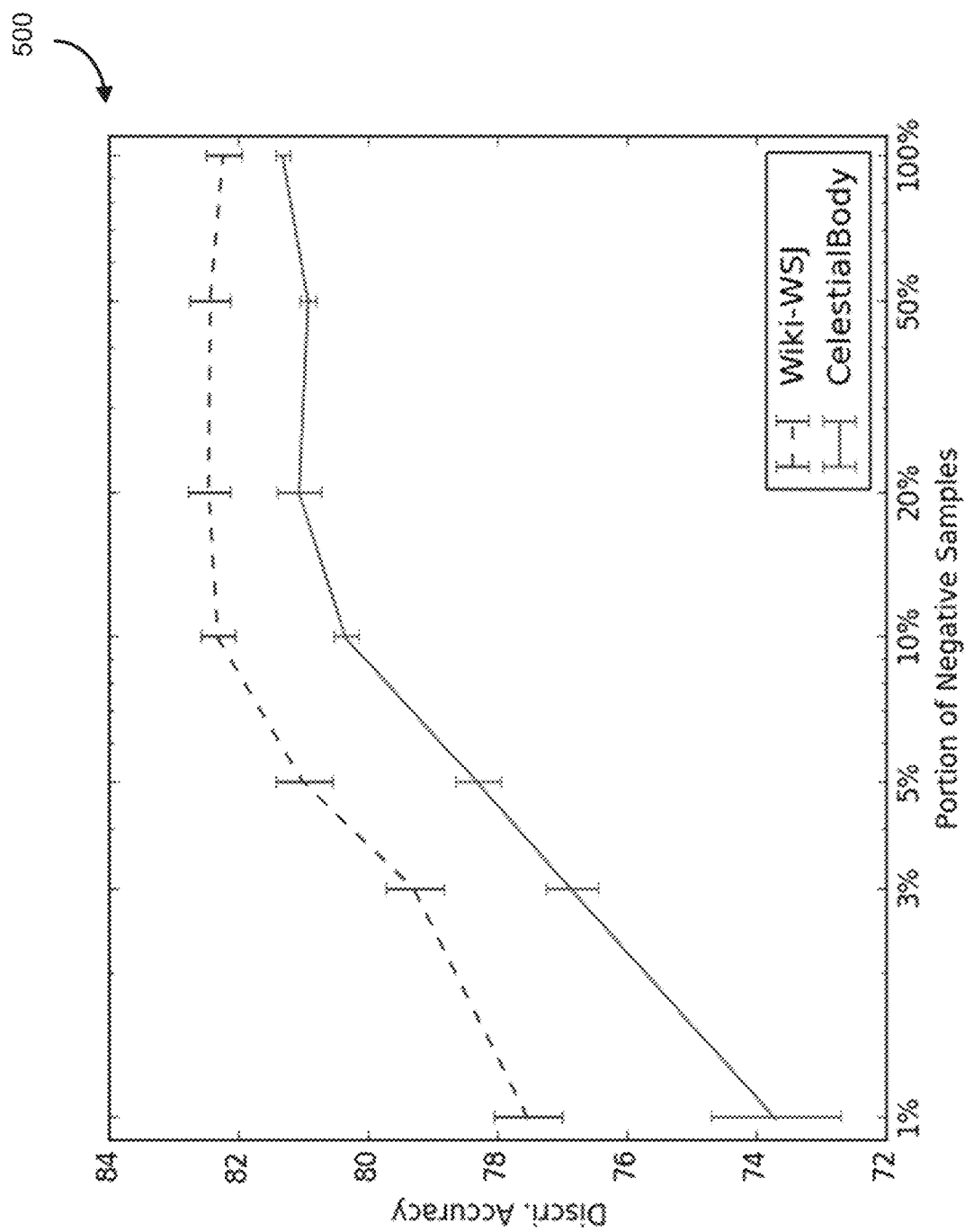
FIG. 5 is a chart showing discrimination accuracy plotted against a portion of negative samples, having lines for two different data sets, according to some embodiments.

FIG. 4 is a schematic diagram of a computing device 400 such as a server. As depicted, the computing device includes at least one processor 402, memory 404, at least one I/O interface 406, and at least one network interface 408.

Processor 402 may be an Intel or AMD x86 or x64, PowerPC, ARM processor, or the like. Memory 404 may include a suitable combination of computer memory that is located either internally or externally such as, for example, random-access memory (RAM), read-only memory (ROM), compact disc read-only memory (CDROM).

Each I/O interface 406 enables computing device 400 to interconnect with one or more input devices, such as a keyboard, mouse, camera, touch screen and a microphone, or with one or more output devices such as a display screen and a speaker.

Each network interface 408 enables computing device 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

Computing device 400 is operable to process received text strings representing articles to establish coherence scores using a backend neural network.

FIG. 6A, 6B, 6C, 6D are string coherence score generation examples provided by an example implementation of an embodiment. Example system outputs are shown demonstrating string coherence score tasks, according to some embodiments.

These are descriptions of authors and key events. The strings are a summary of the person's biography. When things are out of order, the mechanism is clearly able to detect the issues. 0.645 is the global coherence score assessed by the system, where strings 1-10 are in their original order.

The strings were shuffled and the system output a score of −0.35. The score is not bounded (e.g., not normalized), and the shuffled score shows that the mechanism considers the shuffled strings to be incoherent.

FIG. 7A, 7B, 7C, 7D, 7E, 7F, 7G, 7H are string reconstruction examples provided by an example implementation of an embodiment. Imperfect reconstructions are shown where the system of some embodiments attempts to find a correct order based on shuffled orders. This is a challenging technical problem as the system does not have the knowledge of the original order. Random orders were provided, and then the system was tasked with selecting the one with the highest coherence score.

FIG. 7D shows an example set of guessing approaches and orders, along with rank correlations generated on various groups.

In obtaining the correct order, the approach can include performing a search—either the system take a known starting sentence or a null starting sentence, and the system searches through every possible sentence to see which one is one to fall next, and one can perform a "beam search"— each time the system keeps 10-50 possible candidates for the next sentence, and then conduct a tree search to expand for possibilities. As the system cannot expand forever, so at each point, the system can re-rank for coherence score, and this can be performed this until the end to pick the candidate with the highest score.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system of automatically generating a coherence score for a target text data object, the system comprising a processor operating in conjunction with non-transitory computer memory and a data storage, the processor configured to:
   receive, at a string token receiver, a plurality of string tokens representing decomposed portions of the target text data object;
   maintain, on the data storage, a neural network trained against a plurality of corpuses of training text across a plurality of topics, the neural network trained using string tokens of adjacent sentence pairs of the training text as positive training examples and string tokens of non-adjacent sentence pairs of the training text as negative training examples;
   arrange the string tokens to extract string tokens representing adjacent sentence pairs of the target text data object;
   for each adjacent sentence pair, determine, using the neural network, a local coherence score representing a coherence level of the adjacent sentence pair of the target text data object;
   aggregate the generated local coherence scores for each adjacent sentence pair of the target text data object to generate a global coherence score for the target text data object; and
   store the global coherence score or the generated local coherence scores in a data storage.

2. The system of claim 1, wherein the string tokens are real-valued vectors representing a first sentence s and a second sentence t, and wherein the neural network extracts features from each adjacent sentence pairs through applying representations to the real-valued vectors s and t that include at least one of: (1) concatenation of the two vectors (s,t), (2) element-wise difference (s−t), or (3) element-wise product (s*t), or absolute element-wise difference |s−t|;
   wherein the concatenated feature representation of the two vectors is provided into a one-layer perceptron of the neural network to generate the local coherence score for the adjacent sentence pair.

3. The system of claim 1, wherein the processor is configured to execute a discrimination task whereby the target text data object is compared to one or more random or pseudo-random permutations of portions of the target text data object using the trained neural network, and the processor is configured to output, in a data structure, a representation of a permutation of the one or more permutations having a highest global coherence score.

4. The system of claim 1, wherein the processor is configured to execute an insertion task whereby the target text data object includes a portion that has been inserted out of order relative to an original order in the target text data object and the trained neural network is utilized to generate one or more coherence scores for one or more permutations of portions of the target text data object, and the processor is configured to output, in a data structure, a representation of a permutation of the one or more permutations having a highest global coherence score, the permutation having the highest global coherence score identified as indicative of the original order.

5. The system of claim 1, wherein the processor is configured to execute a reconstruction task whereby the target text data object includes one or more portions that have been shuffled out of order relative to an original order in the target text data object and the trained neural network is utilized to generate one or more coherence scores for one or more permutations of portions of the target text data object, and the processor is configured to output, in a data structure, a representation of a permutation of the one or more permutations having a highest global coherence score, the permutation having the highest global coherence score identified as indicative of the original order.

6. The system of claim 1, wherein the neural network is configured for parallel operation, and wherein the determination using the neural network of each local coherence score is conducted across parallel computational pathways, wherein copies of the neural network are established for parallel operation of the neural network, and wherein the parallel computational pathways include using different threads or cores of one or more processors.

7. The system of claim 1, wherein the target text data object is an automatically generated summary or an original text data object, and the global coherence score is utilized in assessing a quality metric of summarization of the original text data object.

8. The system of claim 7, wherein the processor is configured to responsive to the quality metric of summarization of the original text data object being determined to be below a pre-defined threshold, transmit control signals adapted to initiate generation of a second automatically generated summary but with at least one different parameter than the original text data object.

9. The system of claim 1, wherein the plurality of topics of the training text does not include a topic of the target text object.

10. The system of claim 1, wherein the plurality of topics of the training text includes a topic of the target text object.

11. A method of automatically generating a coherence score for a target text data object, the method comprising:
receiving a plurality of string tokens representing decomposed portions of the target text data object;
providing a neural network trained against a plurality of corpuses of training text across a plurality of topics, the neural network trained using string tokens of adjacent sentence pairs of the training text as positive examples and string tokens of non-adjacent sentence pairs of the training text as negative examples;
arranging the string tokens to extract string tokens representing adjacent sentence pairs of the target text data object;
for each adjacent sentence pair, determining, using the neural network, a local coherence score representing a coherence level of the adjacent sentence pair of the target text data object;
aggregating the generated local coherence scores for each adjacent sentence pair of the target text data object to generate a global coherence score for the target text data object; and
storing the global coherence score or the generated local coherence scores in a data storage.

12. The method of claim 11, wherein the neural network is configured for parallel operation, and wherein the determination using the neural network of each local coherence score is conducted across parallel computational pathways.

13. The method of claim 12, wherein copies of the neural network are established for parallel operation of the neural network.

14. The method of claim 12, wherein the parallel computational pathways include using different threads or cores of one or more processors.

15. The method of claim 11, wherein the string tokens are real-valued vectors representing a first sentence s and a second sentence t, and wherein the neural network extracts features from each adjacent sentence pairs through applying representations to the real-valued vectors s and t that include at least one of: (1) concatenation of the two vectors (s,t), (2) element-wise difference (s−t), (3) element-wise product (s*t), or absolute element-wise difference |s−t|.

16. The method of claim 15, wherein the concatenated feature representation of the two vectors is provided into a one-layer perceptron of the neural network to generate the local coherence score for the adjacent sentence pair.

17. The method of claim 11, wherein the target text data object is an automatically generated summary or an original text data object, and the global coherence score is utilized in assessing a quality metric of summarization of the original text data object.

18. The method of claim 17, comprising:
responsive to the quality metric of summarization of the original text data object being determined to be below a pre-defined threshold, transmitting control signals adapted to initiate generation of a second automatically generated summary but with at least one different parameter than the original text data object.

19. The method of claim 11, wherein the plurality of topics of the training text does not include a topic of the target text object.

20. The method of claim 11, wherein the plurality of topics of the training text includes a topic of the target text object.

21. A non-transitory computer readable medium storing machine interpretable instructions, which when executed by a processor, cause the processor to perform a method of automatically generating a coherence score for a target text data object, the method comprising:
receiving a plurality of string tokens representing decomposed portions of the target text data object;
providing a neural network trained against a plurality of corpuses of training text across a plurality of topics, the neural network trained using string tokens of adjacent sentence pairs of the training text as positive examples and string tokens of non-adjacent sentence pairs of the training text as negative examples;
arranging the string tokens to extract string tokens representing adjacent sentence pairs of the target text data object;
for each adjacent sentence pair, determining, using the neural network, a local coherence score representing a coherence level of the adjacent sentence pair of the target text data object;
aggregating the generated local coherence scores for each adjacent sentence pair of the target text data object to generate a global coherence score for the target text data object; and
storing the global coherence score or the generated local coherence scores in a data storage.

22. A non-transitory computer readable medium storing a trained neural network as machine interpretable instructions, the trained neural network which when executed by a processor, causes the processor to perform a method of automatically generating a coherence score for a target text data object, the method comprising:
receiving a plurality of string tokens representing decomposed portions of the target text data object;

providing the trained neural network that was trained against a plurality of corpuses of training text across a plurality of topics, the trained neural network trained using string tokens of adjacent sentence pairs of the training text as positive examples and string tokens of non-adjacent sentence pairs of the training text as negative examples;

arranging the string tokens to extract string tokens representing adjacent sentence pairs of the target text data object;

for each adjacent sentence pair, determining, using the trained neural network, a local coherence score representing a coherence level of the adjacent sentence pair of the target text data object;

aggregating the generated local coherence scores for each adjacent sentence pair of the target text data object to generate a global coherence score for the target text data object; and storing the global coherence score or the generated local coherence scores in a data storage.

* * * * *